No. 629,695. Patented July 25, 1899.
F. B. KNIGHT.
EXCAVATING AND CONVEYING APPARATUS.
(Application filed May 20, 1897.)
(No Model.) 4 Sheets—Sheet 4.
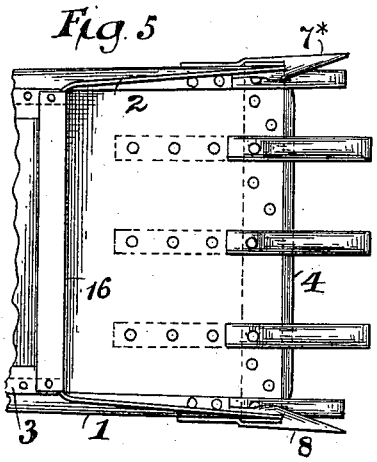
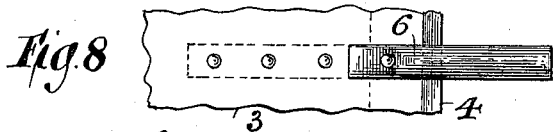
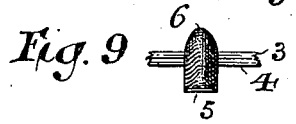
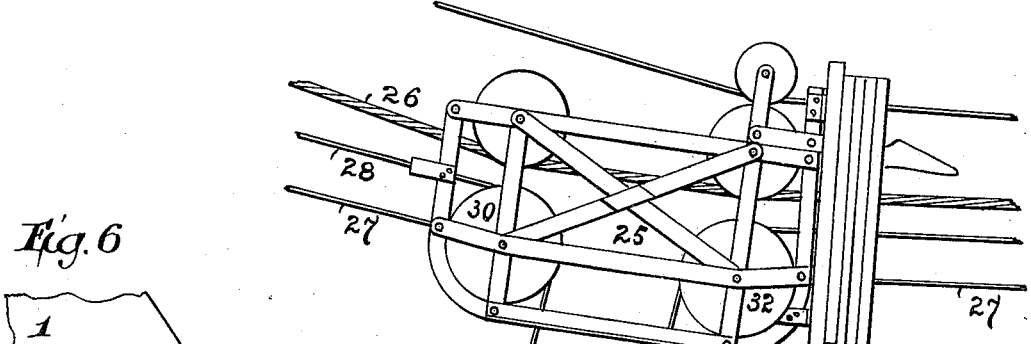
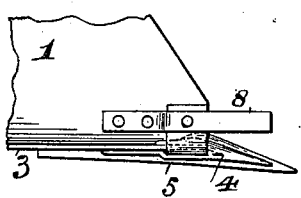
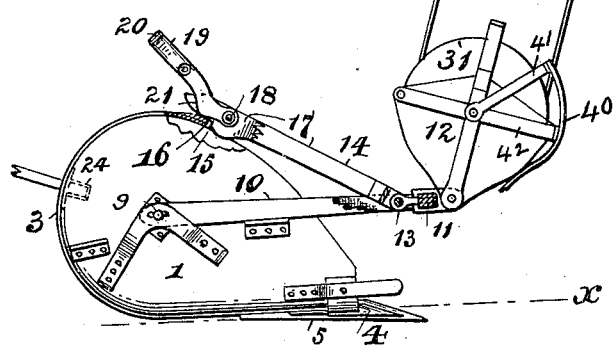
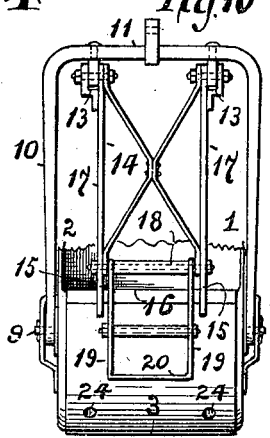
Witnesses
Geo. Wadman
M. Nelson
Inventor
Frank B. Knight
By his attorneys
Gifford & Bull

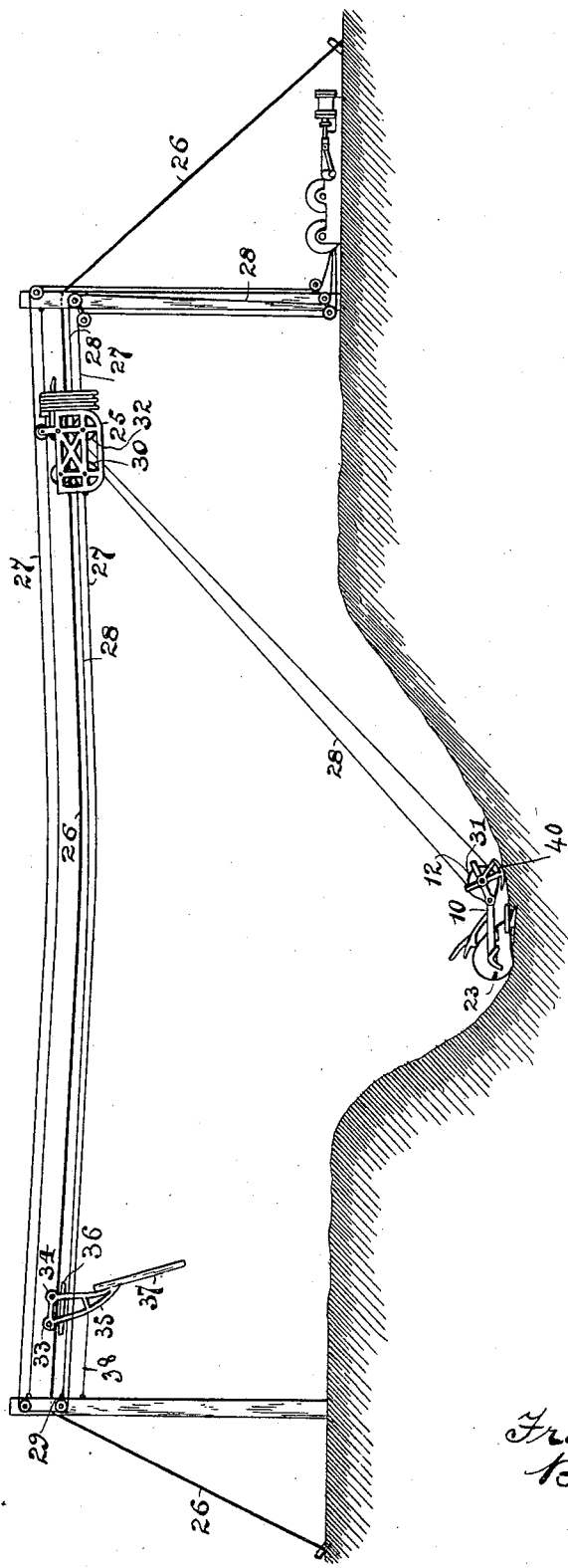

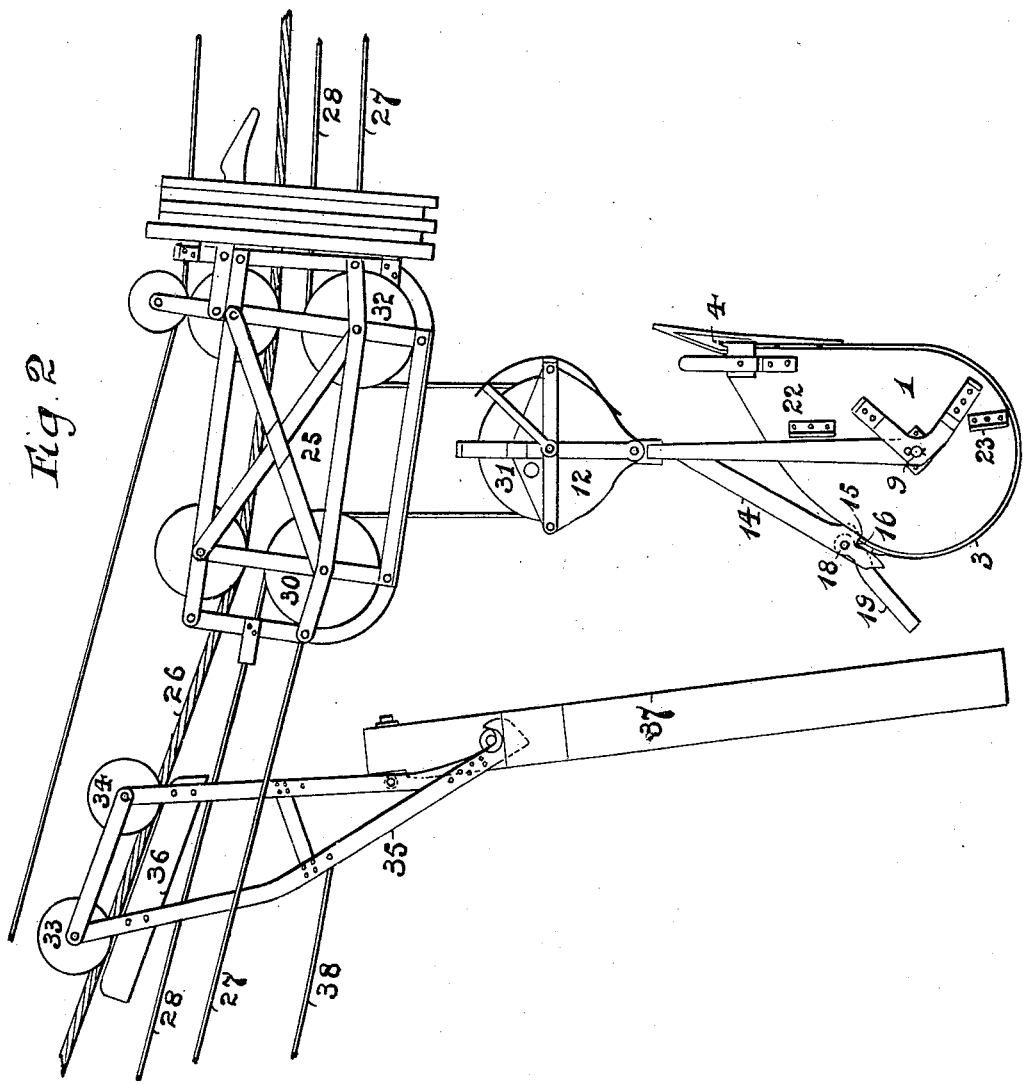

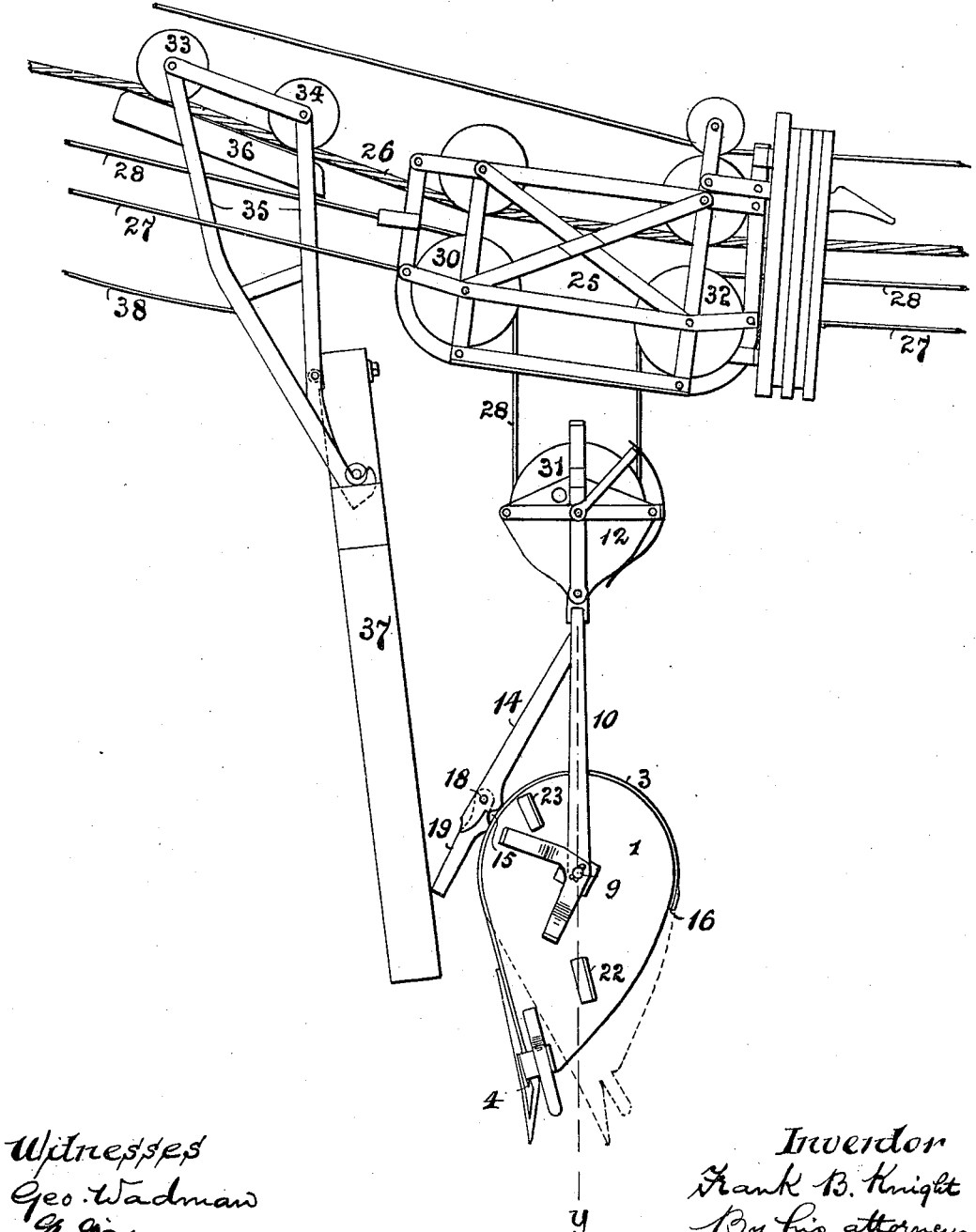

UNITED STATES PATENT OFFICE.

FRANK B. KNIGHT, OF NEW YORK, N. Y.

EXCAVATING AND CONVEYING APPARATUS.

SPECIFICATION forming part of Letters Patent No. 629,695, dated July 25, 1899.

Application filed May 20, 1897. Serial No. 637,310. (No model.)

*To all whom it may concern:*

Be it known that I, FRANK B. KNIGHT, a citizen of the United States, and a resident of New York, (Brooklyn,) in the county of Kings and State of New York, have invented certain new and useful Improvements in Excavating and Conveying Apparatus, of which the following is a specification.

The primary object of my invention is to so construct, connect, and operate a digging scoop-bucket as to adapt the same for excavating hard material such as could not be excavated by apparatus heretofore known, although it is also adapted for excavating comparatively soft materials.

In the accompanying drawings, Figure 1 represents a side view of a cableway containing my invention; Fig. 2, a side view of the carriage and parts adjacent thereto with the bucket represented in conveying position. Fig. 3 is a view similar to the last with the bucket represented in full lines in dumping position and in dotted lines in the position in which it normally hangs after dumping. Fig. 4 represents the bucket and other parts in the act of automatically returning the latch into engagement with the top of the bucket preparatory to the digging position of Fig. 1. Figs. 5, 6, 7, 8, 9, and 10 represent in detail the mouth of the bucket and the teeth, bail, latch, and trigger thereof.

1 and 2 are the side plates of the bucket-shell.

3 is the plate connecting the sides which extend in the form shown in a curved line from the top around the back to the bottom and thence flat to the excavating edge 4. This excavating edge is armed with teeth, each of which is of the construction shown in detail in Figs. 7, 8, and 9. The lower surface 5 is substantially straight and slightly inclined downward with respect to the plane of the bottom of the bucket, which plane is indicated by dotted line $x$ in Fig. 4. In practice I make this downward inclination one inch to the foot. From the point the upper surface of each tooth is upwardly inclined at the center to the apex 6, and from the center the surface descends on either side, so as to perform, in effect, the function of two plowshares placed together. The cutting edge of each tooth is broad and flat and the sides extend substantially parallel with each other backward from the cutting edge. A recess at 7 is made in the rear of each tooth, so as to receive the forward edge of the bottom 4. The forward edge 4 of the bottom is preferably composed of a separate plate $4^a$, extending across the front of the bucket. Each tooth extends backward above and below the recess 7, so as to receive the forward portion of the bottom 3 and the plate $4^a$ between the upper, $6^a$, and lower, $6^b$, extensions of the tooth. The extensions $6^b$ act as shoes upon which the bucket slides. Several of the teeth corresponding with the foregoing description are arranged along the front of the edge of the bottom 4, and on each of the side plates 1 and 2 adjacent to that edge is arranged another tooth of the same general description, which are lettered, respectively, 7* and 8. These side teeth are inclined outwardly, so that they diverge from each other, and therefore cut a wider path in the material than the width of the bucket itself. The combined effect of all of these teeth is to split or loosen up the material in advance of the edge of the bucket, so as to facilitate the filling of the bucket.

I will next describe the connections by which the bucket is carried and operated.

9 are journal-pins fixed to the opposite side pieces 1 and 2 in such position that when supported by these pins the center of gravity of the bucket will be so located with respect to them that the bucket, whether loaded or unloaded, will tend to assume the position shown in Fig. 3 unless prevented by the back latch 14, which can retain the bucket in the position shown in Fig. 2, as will be described. When unloaded, its normal position after dumping is shown in dotted lines.

10 is a bail in the extremities of which the pins 9 are journaled and which bail is unjointed or rigid throughout. The cross-piece 11 of this bail is pivotally connected with the fall-block 12. On the under side of the cross-piece 11 are placed ears 13, to which is pivoted a pendent link or latch 14, provided at its free end with a shoulder 15, adapted to engage with a shoulder 16 on the top of the bucket. The pendent latch 14 is preferably made of the two side pieces 17, each of which contains an engaging shoulder 15. Between the side pieces 17 extends a rod 18, upon which is pivoted a cam-frame, preferably in the form of a bail, formed by the two side pieces 19 and the cross-piece 20. This cam-frame constitutes a trigger for operating the latch. Each side piece 19 is of the form shown in Fig. 4 and contains a cam-surface 21, adapted to rest upon the top 3 of the bucket and to act as a fulcrum between the long arm connected with the cross-piece 20 and the short arm pivoted to the rod 18 in such manner that when the said long arm is thrust toward the top of the bucket the short arm will raise the free end of the latch 14, so as to disengage the shoulders 15 and 16 and permit the bucket to swing on the trunnion-pins 9 from the conveying position shown in Fig. 2 to the dumping position shown in Fig. 3. The plate 3 of the bucket extends from the shoulder 16 on the top in a semicircle substantially concentric with the journal-pins 9, so as to constitute a resting-surface for the free end of the latch as the bucket rotates on those journal-pins.

22 are stops fixed to the bucket to contact with the bail 10 and to limit the motion in one direction, and 23 are stops to limit the motion in the other direction. Sockets 24 are connected with the plate 3 of the bucket at the rear, into which handles may be removably inserted in such position that the distance between the handles is less than the width of the bucket, and therefore the hand of the workman is protected against contact with the bank being excavated.

The fall-block 12 and the carriage 25 are of usual construction.

26 is the main cable.

27 is the endless traction-rope.

28 is the fall-rope, one end of which is fixed to the tail tower or support at 29 and which extends over the carriage-sheave 30, thence down to and around the fall-block sheave 31, thence up and over the carriage-sheave 32, thence to the head tower or support, and thence to the rope-drum engine. I prefer this method of supporting and connecting the fall-rope, but do not limit myself thereto.

Between the carriage and the tail tower or support is mounted upon the cable 26 a supplemental carriage containing the wheels or bearings 33 and 34, running on said cable, and a suitable frame 35, carried by said wheels and extending downward on each side of the cable and supporting the piece 36 immediately below the cable and the piece 37 in substantially the position shown in Fig. 2. This position is such that the combined weight of the parts supported by the wheels 33 and 34 will be carried by both of said wheels when the part 37 is held in the position shown in Fig. 2, where it is held slightly forward to meet the bucket, so that when the bucket approaches and the trigger strikes against the part 37 and presses that part backward the wheels 33 34 will be blocked against backward movement by the clamping of the piece 36 against the under side of the cable 26, the support being thrown entirely upon the wheel 34. The forward position on the cable of the frame 35 is fixed and adjusted by a rope 38, connecting it with the tail-tower.

The operation of the apparatus is as follows: Supposing the bucket of Fig. 2 to be loaded and the carriage 25 to be advanced by the traction-rope toward the carriage 35, as soon as the trigger 19 strikes against the piece 37 its free end will be thrown toward the top of the bucket, and it will thus disengage the latch, so as to leave the bucket free to turn upon the trunnion-pins 9, which it will do because of its center of gravity being above said trunnion-pins and in front of the line of suspension by the bail 10. This produces the dump, and the bucket will remain in the position shown by dotted lines in Fig. 3 until the carriage has been run back to a position above the point of excavation and the bucket has been lowered by the fall-rope onto the ground. The teeth are normally suspended forward of the vertical plane $y$ of the bail. Therefore after they touch the ground the bucket will normally descend to the position shown in Fig. 1, so as to rest on its bottom. The engineer then moves the carriage farther forward, so as to bring the bail 10 into a forwardly-inclined position. At the same time he lowers on the fall-rope until the bail is lowered to the position shown in Fig. 4, causing the shoulders 15 and 16 to reëngage. The parts are then in position for excavating, and the engineer runs the carriage farther forward, as shown in Fig. 1, to give the proper draft for filling the bucket. The direction of this draft with respect to the level of the bank may be varied by the engineer by a proper manipulation of the traction-rope and fall-rope.

It will be observed that when the bucket is in condition for excavating the cross-piece 11 of the bail is held rigidly with respect to the bucket and extends rigidly to a position in advance of a plane extending from the points of the teeth at right angles to the plane $x$ of the base of the bucket. With this construction there will be no undue tendency for the bucket to upset when the cutting edge strikes an obstruction.

A shield 40 is fastened to the members 41 42 of the fall-block, which shield is made of sheet metal of the curved form shown to act as a runner for the fall-block to rest on in the position shown in Fig. 1 and to prevent dirt or small stones getting between the sheave and rope in the fall-block.

I claim—

1. A digging scoop-bucket, in combination with a series of teeth arming the digging edge of the base thereof and a tooth arming the digging edge of each side thereof adjacent to the base; each of said side teeth being double-plow shaped and having its point directed in a line diverging from the side line of said bucket, substantially as described.

2. In combination, a digging scoop-bucket, a rigid bail pivoted thereto and a rigid latch pivoted to said bail and engaging with the top of said bucket and a trigger 19, substantially as described.

3. In a conveying apparatus, in combination, a digging scoop-bucket, a bail pivotally connected therewith below its center of gravity when loaded, a latch interposed between said bail and the top of the bucket and a trigger pivoted to said latch and fulcrumed on the bucket whereby said latch is disengaged from the bucket to permit the bucket to dump, substantially as described.

4. In combination, a digging scoop-bucket, a bail, a fall-block and a fall-block shield 40, substantially as described.

5. A digging scoop-bucket, in combination with a series of digging-teeth arming and mounted upon its digging edge, a rigid bail, means whereby said bail is rigidly held in a fixed position with respect to the body of the bucket except when the same is dumping, a pivotal connection with the forward end of said bail which constitutes the point of draft in digging; said point of draft being immovably located forward of a plane extending from the extreme forward digging-teeth connected with said bucket perpendicular to the base plane of said bucket, substantially as described.

6. In combination, a digging scoop-bucket, a rigid bail pivoted thereto, a rigid latch pivoted to said bail, a shoulder 16 on said bucket with which said latch engages, said bucket being provided with a curved surface extending backward from the shoulder 16 whereon the free end of said latch is supported as the bucket rotates in the bail, substantially as described.

7. In combination, a digging scoop-bucket, a rigid bail pivoted thereto, a rigid latch pivoted to said bail, a shoulder 16 on said bucket with which said latch engages, a member 22 which coöperates with said latch and shoulder to hold the bucket from rotation, and a series of teeth arming the digging edge of said bucket; the forward edges of said teeth being backward of the forward end of said rigid bail whereby is prevented the overturning of the bucket by the striking of said teeth against an obstruction, substantially as described.

8. In combination, a digging scoop-bucket, a bail pivotally connected therewith below its center of gravity when in conveying position, members 14 and 22 coöperating to prevent the rotation of the bucket in the bail, mechanism whereby one of said members may be withdrawn to permit the dumping of said bucket; said members holding said bucket in such position in said bail that the digging edge of said bucket is backward of the forward end of said bail, substantially as described.

9. In combination, a digging scoop-bucket, a series of teeth arming the edge thereof, a rigid bail pivotally connected therewith below its center of gravity when in carrying position, a connection between said bail and said bucket whereby said bucket is prevented from dumping, means whereby said connection is moved to permit of dumping, a pivotal connection with the forward end of said bail which constitutes the point of draft in digging; said point of draft being located forward of a plane extending from the extreme forward digging member connected with said bucket perpendicular to the base plane of said bucket, substantially as described.

10. In a conveying apparatus, in combination, a cable, a load-carriage mounted thereon, a fall-rope, a bucket suspended by said fall-rope, latch mechanism whereby said bucket is restrained from dumping and adapted for being unlatched by movement in line with said cable against an abutment, an abutment 37 in the path of said latch mechanism, the bearings 33 and 34 and the clamping device 36 whereby the pressure of said latch mechanism against said abutment in the line of said cable causes said cable to be clamped, substantially as described.

FRANK B. KNIGHT.

Witnesses:
W. WILSON,
CHAS. RATHJEN.